UNITED STATES PATENT OFFICE.

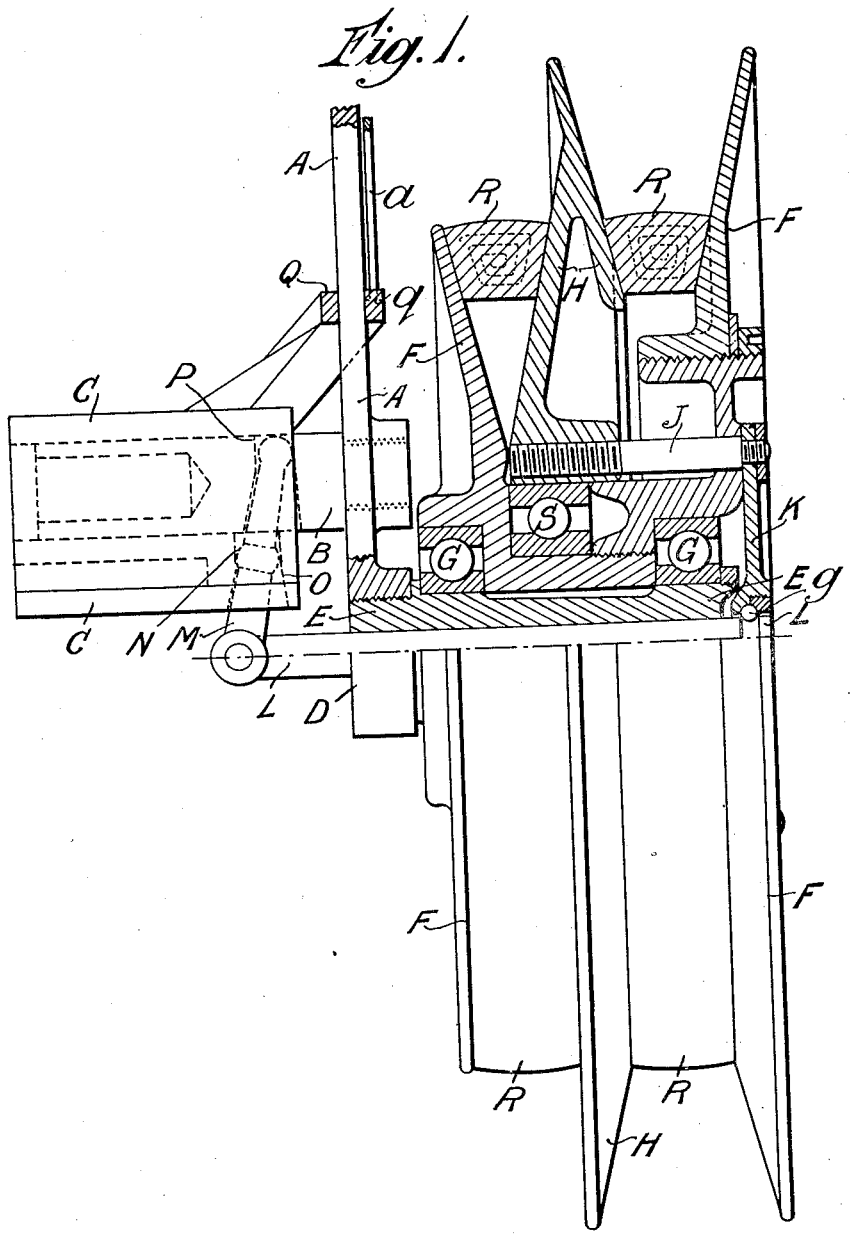

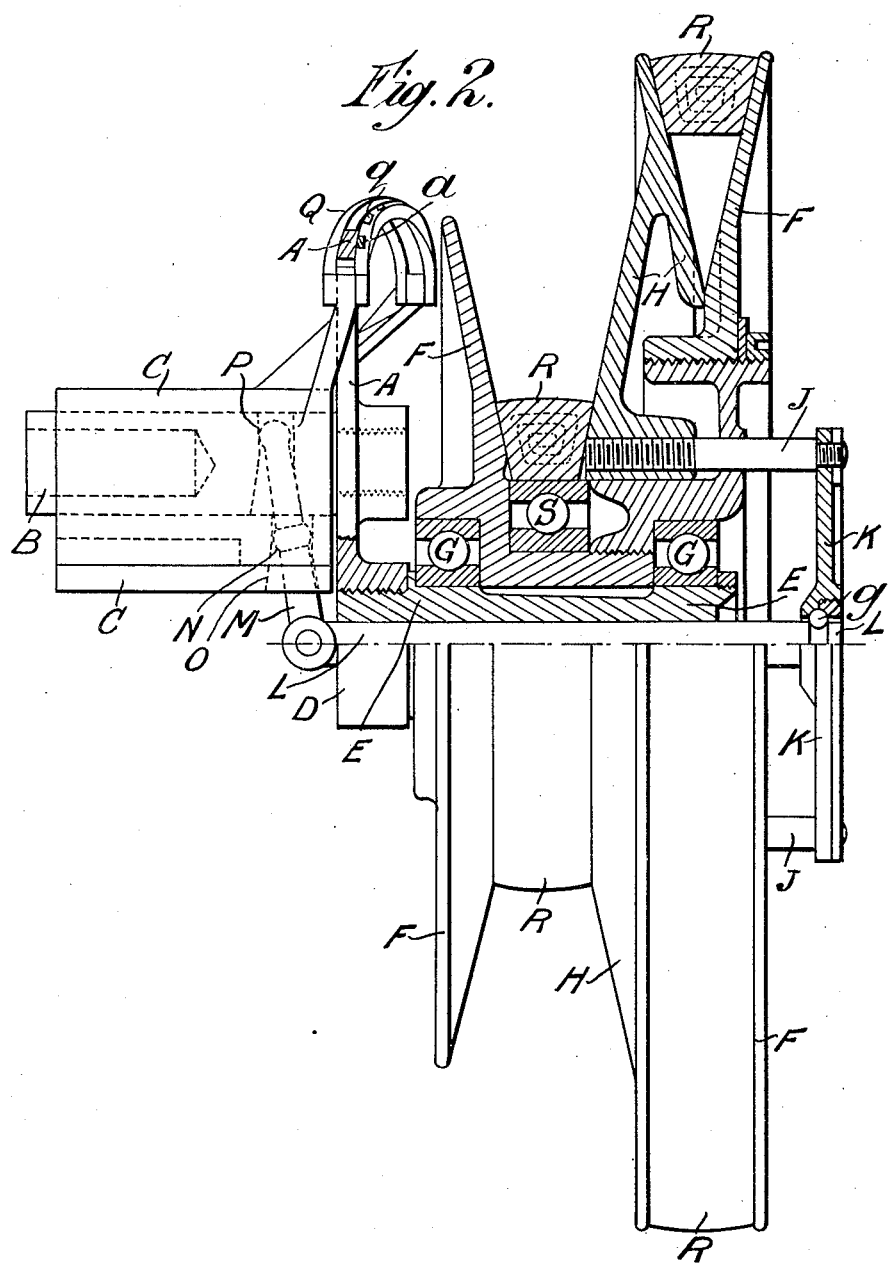

PERCY GEORGE TACCHI, OF ACTON, LONDON, ENGLAND, ASSIGNOR TO T. A. C. LIMITED, OF HANWELL, ENGLAND.

VARIABLE-SPEED GEAR.

1,408,421.     Specification of Letters Patent.     Patented Feb. 28, 1922.

Application filed December 10, 1921. Serial No. 521,528.

*To all whom it may concern:*

Be it known that I, PERCY GEORGE TACCHI, a subject of the King of Great Britain, residing at Acton, London, England, have invented new and useful Improvements in Variable-Speed Gears, (for which I have filed an application in Great Britain, August 27, 1920,) of which the following is a specification.

This invention relates to variable speed belt gear in which belts of a V or wedge shape in cross section transmit power from a driving wheel to an intermediate pulley and thence to a driven wheel, the pulley being constructed of two conical outer flanges and two conical inner flanges and being so arranged that the transverse movement of the inner flanges with respect to the outer flanges can be effected to vary the speed of the driven wheel relative to the driving wheel, while the compound pulley can be moved as a whole away from one wheel and towards the other to keep the correct tension on the belts.

The object of this invention is to provide improved gear of this type in which the necessary transverse movement of the outer flanges, the necessary equal and opposite transverse movement of the inner flanges and the longitudinal movement of the compound pulley as a whole, shall all be positively controlled by a single handle.

My invention is illustrated by the accompanying drawing. Figure 1 is a part sectional elevation of the gear with the belts in one limiting position thereon and Figure 2 is a part elevation of the gear in the other limiting position.

A is a hand lever secured upon a pin B which can move transversely and rotate in a fixed support C. On the lever A is a boss D fast with which is a tube E on which can rotate the compound pulley composed of outer flanges F and inner flanges H. To these inner flanges are secured studs J which pass through holes in one of the outer flanges F and are secured to a plate K which rotates upon and can be moved transversely by a pin L which passes through the tube E and is connected to a lever M capable of rocking about its central fulcrum N in a slot O in the support C. The end of this lever remote from the pin L lies within the slot P in the pin B. Q is an oblique quadrant firmly secured to the support C and the hand lever A can be moved within this quadrant the obliquity of which determines the transverse movement of the handle A and pin B and therefore the transverse movements of the flanges F and H. The handle is provided with the usual rod $a$ adapted to engage notches $q$ in the quadrant and thus to hold the handle in any desired position. R, R, are two belts shown in Figure 1 as passing round the compound pulley at equal distances from its axis, while in Figure 2 the one belt is running on a much smaller diameter than the other belt. G, G, are ball bearings on which the outer flanges F run, $g$ is a ball thrust on which the plate K runs and S is a ball bearing upon which the inner belt runs in the position shown in Figure 2. It will be seen that starting with the extreme position as shown in Figure 1 the lever A can be moved in the quadrant Q to the other extreme position as shown in Figure 2. Thus the pin B will be moved into the support C and the outer flanges F will similarly be moved to the left, while owing to the interposition of the lever M the inner flanges H will be moved through an equal distance to the right, thus the belts will be brought into the position shown in Figure 2, while owing to the movement of the handle around the quadrant, A, B and M, will have turned around the axis of the pin B and the compound pulley will have swung as a whole nearer to the wheel around which the right hand belt passes and further from the wheel around which the left hand belt passes. Thus the speed of the driven wheel will have been altered relatively to the speed of the other wheel while the tensions of the belts will have been kept constant and the belts will have been kept in line.

What I claim is:—

1. In variable speed gear, the combination of a compound pulley having outer flanges and inner flanges and capable as a whole of a swinging movement, a handle adapted to move the pulley and means whereby any movement of the handle which imparts this swinging movement to the pulley positively causes a transverse movement of the outer flanges and an equal and opposite transverse movement of the inner flanges.

2. In variable speed gear, the combination of a fixed arc, a handle adapted to move in this arc, a pair of outer flanges and a pair of inner flanges constituting a compound pulley and means whereby a movement of the handle in the arc imparts a swinging movement to the pulley and imparts a transverse movement to the outer flanges and an equal and opposite transverse movement to the inner flanges.

3. In variable speed gear, the combination of a support, an oblique quadrant secured thereto, a pin capable of rotary and axial movement in the support, a handle fast on the pin and controlled by the quadrant, two pulley flanges supported on and capable of rotation relatively to the handle, a pair of inner pulley flanges between the outer flanges and means whereby a movement of the handle in the quadrant imparts to the inner flanges a transverse movement equal and opposite to that of the outer flanges.

4. In variable speed gear, the combination of a support, an oblique quadrant secured thereto, a pin capable of rotary and axial movement in the support, a handle carried by the pin and capable of movement in the quadrant, a tube carried by the handle, a pair of outer pulley flanges capable of rotation on the tube, a pin passing through the tube, a pair of inner pulley flanges connected to the pin and a lever fulcrumed in the support and connecting the two pins.

5. In variable speed gear, the combination of a support, an oblique quadrant secured thereto, a pin capable of rotary and axial movement in the support, a handle fast on the pin and capable of movement in the quadrant, a tube carried by the handle, a pin passing through the tube, a lever fulcrumed in the support and having one end pivoted to the second pin while the other end lies in a slot in the first pin, a pair of outer pulley flanges rotatably supported by the tube, a plate supported by the second pin, a pair of inner pulley flanges between the outer flanges and studs connecting the inner flanges to the plate.

In testimony that I claim the foregoing as my invention I have signed my name this 28th day of November 1921.

PERCY GEORGE TACCHI.